Jan. 12, 1954
R. HEIDECKE
2,665,618
LIGHT BAFFLE STRUCTURE FOR PHOTOGRAPHIC CAMERAS
Filed Oct. 24, 1950
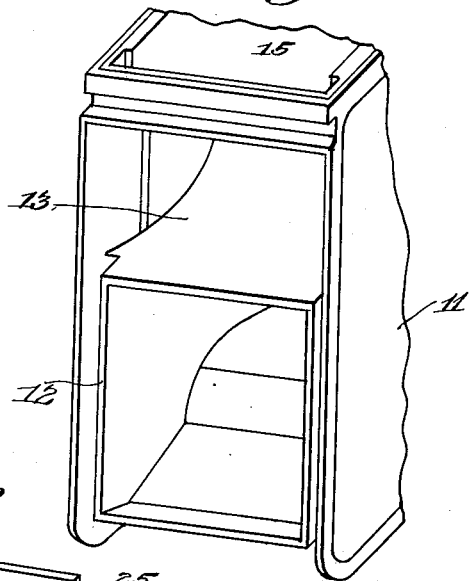
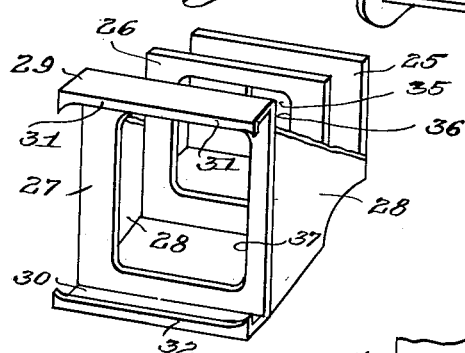
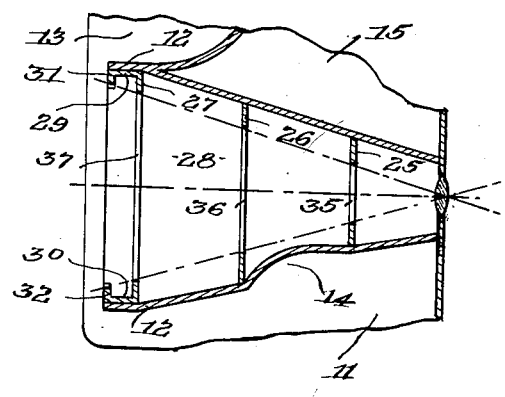
INVENTOR.
Reinhold Heidecke
BY Charles Shepard
his Attorney Patented Jan. 12, 1954

2,665,618

UNITED STATES PATENT OFFICE 2,665,618

LIGHT BAFFLE STRUCTURE FOR PHOTOGRAPHIC CAMERAS

Reinhold Heidecke, Braunschweig, Germany, assignor to Franke & Heidecke, Fabrik Photographischer Präzisions - Apparate, Braunschweig, Germany, a firm of Germany Application October 24, 1950, Serial No. 191,794

Claims priority, application Germany October 27, 1949

1 Claim. (Cl. 95—11)

This invention relates to a photographic camera body, and particularly to a camera body of what is sometimes called the box type.

The light which enters a camera body, during exposure, at such an oblique angle to the optical axis that it does not fall upon the picture area of the film, not only is useless in taking the picture, but also is distinctly detrimental in that it may cause a somewhat general illumination of the interior of the camera body, thereby fogging the film. In order to avoid this, it has been customary to make the interior of the camera body black, so as to absorb as much as possible of this stray light which enters the camera during exposure. It has also been proposed to use walls for trapping the stray light, but the walls in the forms heretofore used have usually been either difficult or expensive to manufacture, or both.

An object of the present invention is to provide the camera body with light-impeding or light-trapping baffle walls of a more simple and inexpensive form than those heretofore used, for cutting off the stray light which does not form part of the effective pyramid or cone of light rays and which is not intended to reach the picture area of the film.

Another object of the invention is the provision of such walls in a particularly efficient form.

A further object is the provision of such walls in a form adapted to modern methods of manufacture of camera bodies by die casting or molding from metal or plastic material.

A still further object of the invention is the provision of a main camera body structure, in combination with a baffle wall structure separately manufactured for ease of die casting or molding, the baffle wall structure being so designed and constructed that it may be easily and quickly inserted in proper position in the main body structure and be permanently retained therein.

These and other desirable objects are attained in the manner disclosed as an illustrative embodiment of the invention in the following description and in the accompanying drawings forming a part hereof, in which:

Fig. 1 is a fragmentary perspective view, from the rear, of a camera body structure adapted to receive the baffle wall structure;

Fig. 2 is a perspective view, from the rear, of the baffle wall structure of the present invention, with parts broken away; and Fig. 3 is a fragmentary longitudinal section, taken along the optical axis, of a portion of the camera body with the baffle wall structure therein.

The same reference numerals through the several views indicate the same parts.

As an illustrative embodiment of the invention, the structure is shown as applied to a box camera of the reflex type having a focusing and view-finder chamber arranged in the upper part of the camera body, above the picture taking chamber. It is obvious, however, that the same principles may be applied to cameras of other types.

The camera body or housing is fragmentarily shown in general at 11. A rearwardly extending flange 12 approximately defines the picture area of the film which is to be exposed at any given exposure, the film being drawn over the rear edges of this flange 12 or over any suitable film holding mechanism of known design, arranged at or near the flanges 12. The film is supplied from the usual spool or roll in the film spool chamber 13, and is wound up in conventional manner on a spool in the spool chamber 14. The focusing and view-finding chamber is indicated in general at 15. The back cover of the camera, the lens, the shutter, and other details of the camera except as otherwise specifically disclosed herein, may be of any usual or conventional construction.

The baffle wall structure which fits inside the exposure chamber of the camera body structure comprises a plurality of walls arranged transversely to the optical axis and preferably at right angles thereto, three walls being here shown as indicated at 25, 26, and 27. These transverse walls are all held together as an integral unit by longitudinal side walls 28. At the top and bottom of the rear transverse wall 27 there may be rearwardly extending horizontal flanges 29 and 30, to fit against corresponding flat areas at the top and bottom of the exposure chamber, these flanges 29 and 30 terminating respectively in narrow downwardly and upwardly extending flanges 31 and 32 which lie against or substantially against the front face of the film and serve as additional guides or supports for the film at top and bottom edges of the exposure area. The external dimensions of the baffle wall structure are such that this structure fits snugly into the available space in the exposure chamber of the camera body, but may be easily inserted therein by a forward motion through the open back of the camera.

The various transverse baffle walls 25, 26, and 27 are all provided with central apertures for passage of the effective pyramid or cone of light from the camera lens toward the exposure area of the film, the apertures respectively increasing in size from the front toward the rear of the camera, in accordance with the increasing cross-section of the effective pyramid or cone of light rays from the camera to the exposure area of the film. These apertures are indicated respectively at 35, 36 and 37. They are only of sufficient size to pass the necessary light rays in order to illuminate the picture area. Hence, when this baffle wall structure is placed inside the camera body structure, in proper position, any stray light which enters through the lens and which lies appreciably outside of the effective pyramid of rays will impinge upon the forward surface of one or another of these baffle walls, and whatever part of such stray light is not absorbed by the blank coating on the baffle wall, will be reflected forwardly, away from the film, thus minimizing the danger of any stray light reaching the film to cause fogging.

With this construction, the camera body structure itself may be so designed that it can be formed by die casting or molding, without any added difficulty from baffle walls which might prevent easy withdrawal of the structure from the die or mold. Likewise, the baffle wall structure itself is designed so that it may be readily withdrawn from the die or mold by which it is made, and thus it may be and preferably is made as a single integral unit by die casting or molding, although it is within the scope of the invention to fabricate the baffle structure from separate pieces of sheet material.

After it is manufactured, the baffle wall structure is then inserted into the exposure chamber of the camera body, and the interior of the camera body and of the baffle wall structure is then sprayed in conventional manner with black paint or other suitable black coating material, so that the paint or coating material itself will serve to bond the baffle wall structure to the camera body structure and retain the former permanently in the latter. In practice, it is found that the paint itself is entirely sufficient for holding the baffle wall structure in the body structure, but additional fastening means such as screws or rivets may be used if desired.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claim.

What is claimed is:

The combination with a camera of the type having a rigid body including rigid walls forming an exposure chamber and rigid walls forming a reflex focusing chamber in the body above the exposure chamber, said exposure chamber being capable of being opened at its back end, of a unitary one-piece rigid baffle wall structure insertable into said exposure chamber from the rear when its back end is opened, said baffle wall structure having two lateral walls extending in a general fore and aft direction and lying closely adjacent the inner surfaces of the rigid side walls of said exposure chamber, and a series of light-baffle partitions integrally connected to and supported from said lateral walls and extending substantially perpendicular to the optical axis of the exposure chamber, each baffle partition having approximately centrally therein a light-transmitting aperture, the apertures being of progressively increasing size from the front partition to the rear partition, said baffle wall structure terminating at its rear end in a rearwardly extending bottom flange and a rearwardly extending top flange spaced from and approximately parallel to each other, and film guide flanges integral with said top and bottom flanges at the rear edge thereof and having flat rear faces lying substantially in a common plane perpendicular to said optical axis of the exposure chamber to serve as a guide for positioning photographic film.

REINHOLD HEIDECKE.

References Cited in the file of this patent

UNITED STATES PATENTS

| Number | Name | Date |
|---|---|---|
| 451,134 | Riddle | Apr. 28, 1891 |
| 1,397,661 | Sark | Nov. 22, 1921 |
| 1,479,112 | Sparks | Jan. 1, 1924 |
| 2,000,588 | Fuerst | May 7, 1935 |
| 2,242,317 | Metcalf | May 20, 1941 |
| 2,373,936 | Wright | Apr. 17, 1945 |
| 2,397,031 | Merritt et al. | Mar. 19, 1946 |

FOREIGN PATENTS

| Number | Country | Date |
|---|---|---|
| 373,319 | France | Mar. 15, 1907 |
| 591,858 | France | Apr. 18, 1925 |
| 768,516 | France | May 22, 1934 |